Sept. 2, 1941. C. C. LE SUER ET AL 2,254,430
SEED CLEANING APPARATUS
Filed April 29, 1939 3 Sheets-Sheet 3

Inventors
Clarence C. LeSuer,
Sidney O. Evans,

By Clarence A. O'Brien
and Hyman Berman
Attorneys

Patented Sept. 2, 1941

2,254,430

UNITED STATES PATENT OFFICE 2,254,430

SEED CLEANING APPARATUS

Clarence C. Le Suer and Sidney O. Evans, Hamilton, Mont.

Application April 29, 1939, Serial No. 270,868

3 Claims. (Cl. 209—467)

Our invention relates to improvements in seed cleaning apparatus for separating foreign matter from seed such as beans, corn, peas and small seed, and all seeds or materials where gravity separation is made on an oscillating deck with upward air blast.

The invention is designed with the particular purpose in view of providing an improved runway and gate assembly for use on the usual deck of an air blast separator and for separating such foreign matter as culls, rock and adobe from seed without wasting the stock and without having to resort to re-running the stock through the separator.

Another object is to provide for building up the stock on the deck so that under the action of air under pressure forced upwardly therethrough the heavier foreign matter such as rock and adobe will gravitate to the bottom of the stock and the lighter culls will float to the top and to provide means for separating such matter from the stock with a minimum loss of stock while at the same time providing for discharge of the good or clean stock from the runway.

Other objects, more or less subordinate in nature, are also comprehended by our invention, all of which together with the precise details of construction and combination of parts involved in the invention will be readily apparent when the following description and claims are read with reference to the drawings accompanying and forming part of this specification.

In said drawings:

Figure 7 is a view in elevation of one of the discharge gates of the cull discharge assembly.

Figure 8 is a similar view of one of the stock delivery gates, and

Figure 9 is another similar view of the overflow gate.

Figure 1:
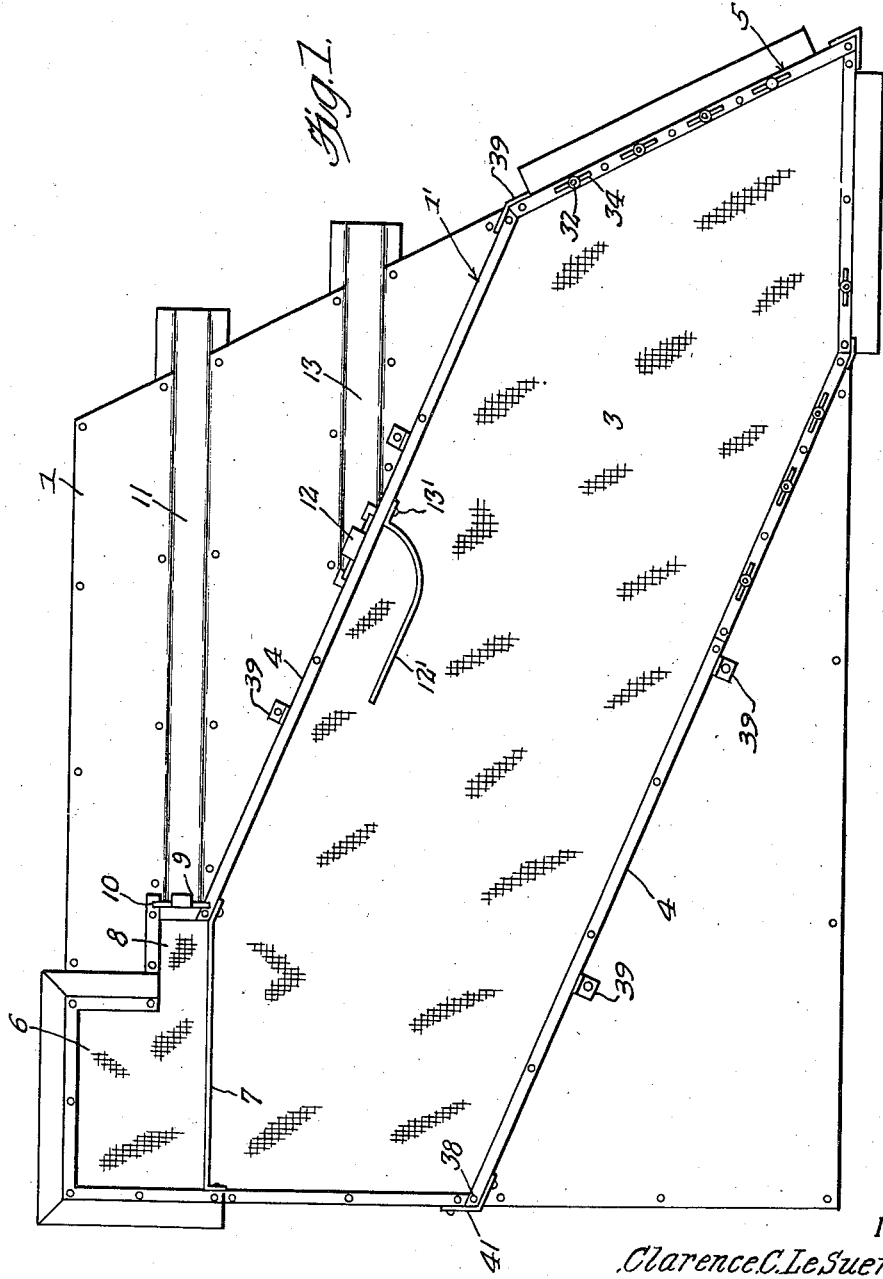
Figure 1 is a view in top plan of the deck of a seed cleaner equipped with our improved runway and gate assembly.
Figure 2:
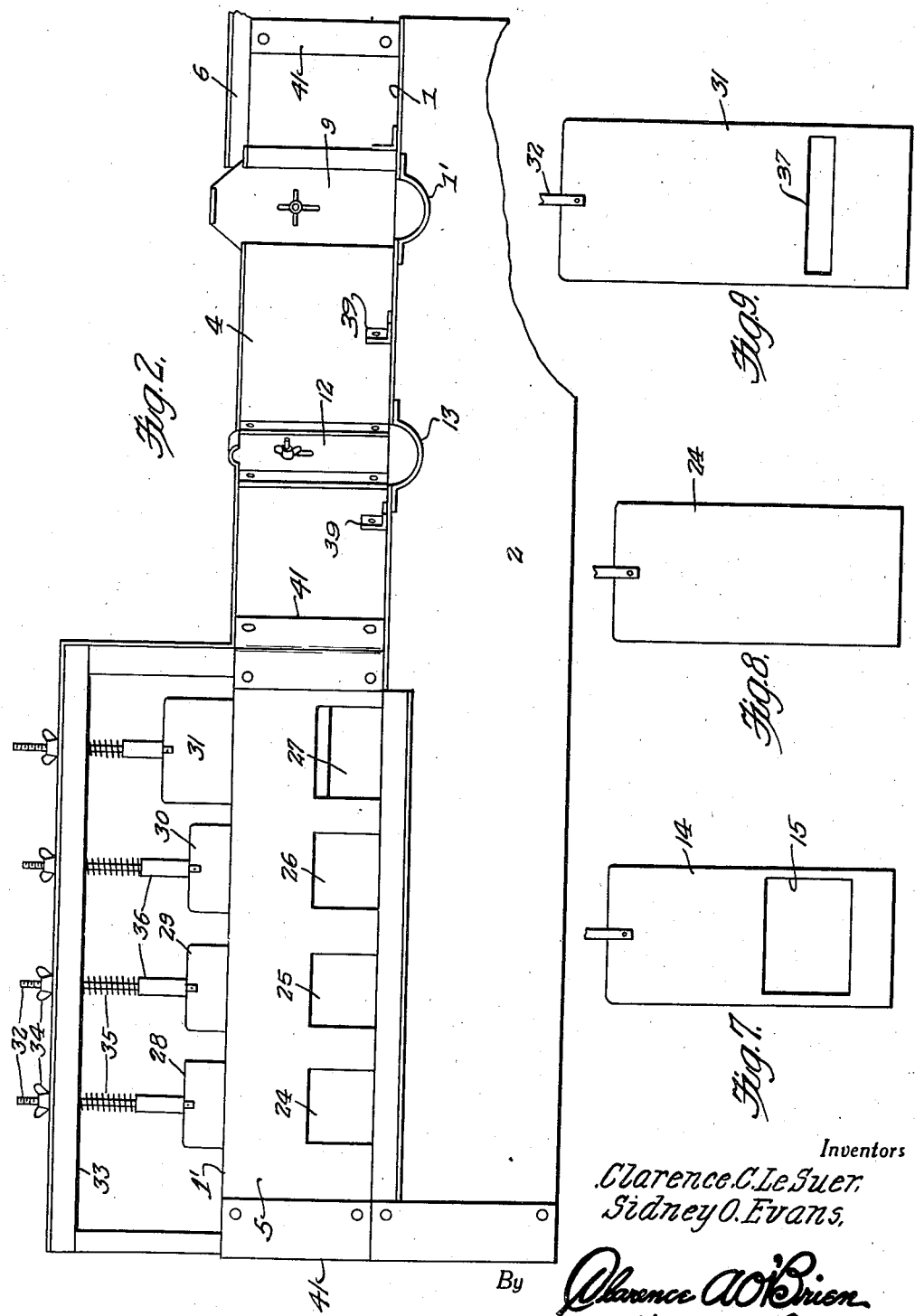
Figure 2 is a view in end elevation looking at the stock delivery end of the runway drawn to an enlarged scale.
Figure 3:
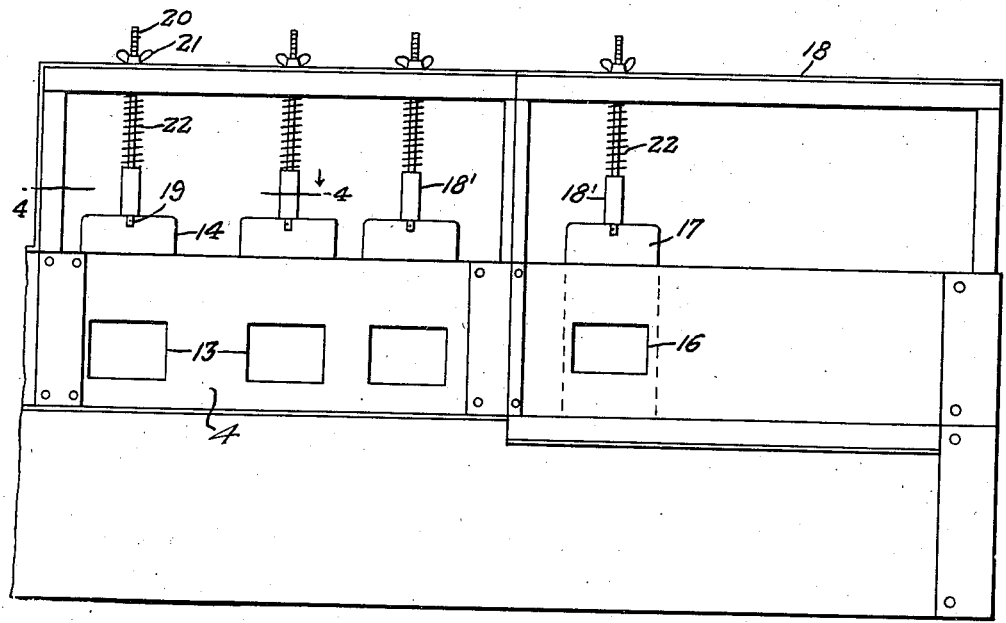
Figure 3 is a fragmentary view in side elevation illustrating on an enlarged scale the cull discharge battery of gates.
Figure 4:
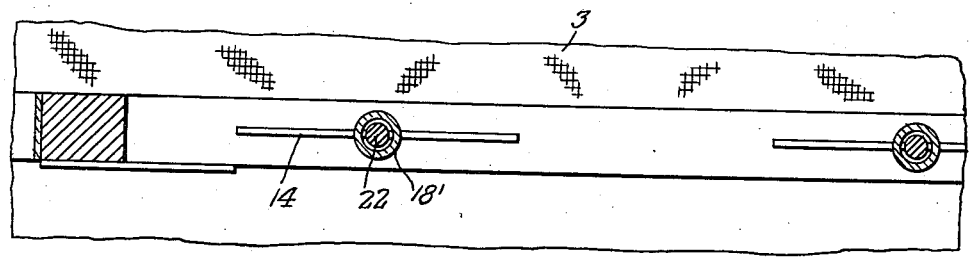
Figure 4 is a detail view in horizontal section taken on the line 4—4 of Figure 3 looking downwardly as indicated by the arrows.
Figure 5:
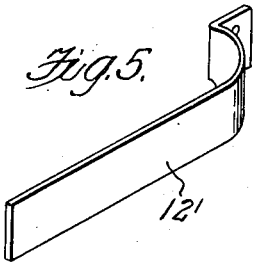
Figure 5 is a view in perspective of the adobe trap baffle.
Figure 6:
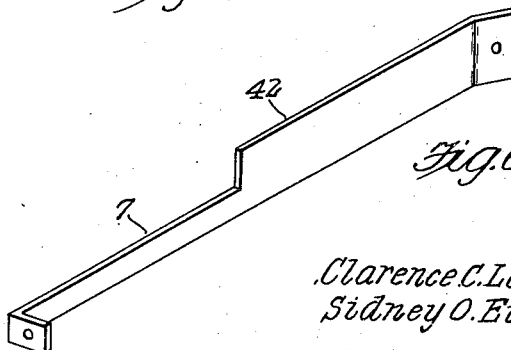
Figure 6 is a similar view of the rock trap baffle.

Referring now to the drawings by numerals, the improved runway and gate assembly of our invention is designed for application to any of the types of seed cleaners of commerce operating by air under pressure passing upwardly through a deck or top. Such cleaners, or separators, being well known and understood in the art, it has not been deemed essential to a proper understanding of our invention to illustrate the details of a cleaner.

According to our invention, the deck 1 of the cleaner, or separator, represented at 2, is equipped with a runway 1' in the form of an open-top bin, or hopper, of narrow elongated form extending obliquely, lengthwise from one corner of said deck to the diagonally opposite corner thereof and having a foraminous bottom 3. The runway 1' comprises parallel side walls 4, an obtuse angled seed delivery end 5 and a laterally extending opposite feed end 6 of hopper-like construction into which the stock is introduced. Preferably the runway 1' inclines slightly lengthwise from the feed end 6 to the seed delivery end 5.

The deck 1 is of the type adapted to be vibrated in the general direction of the length of the runway 1', as, for instance, by mechanism such as shown in U. S. Patent No. 1,315,880.

Between the feed end 6 and the remainder of the runway 1' is a rock deflecting baffle 7 forming together with one wall of the runway 1' a rock trap 8 extending laterally of the runway 1' to one side thereof and closed by a gate 9 vertically slidable in suitable guideways 10 provided in said side wall 4. A rock discharge chute 11 is formed in the deck 1 to extend from said gate 9 to one edge of said deck 1.

A second gate 12 similar to gate 9 is provided in the same side wall 4 that said gate 9 is located in for the discharge of adobe from the runway 1' and a discharge chute 13, similar to chute 11, is provided in the deck 1 leading from said gate 12 to the same edge of said deck as the chute 11. A baffle plate 12' is attached, as at 13', to said side wall 4 to extend inwardly therefrom and then parallel therewith along the bottom 3 so as to form with said side wall an adobe trap opening toward the feed end 6 and into a suitable adobe discharge gateway (not shown) provided in said wall 4 and opened and closed by said gate 12.

The side wall 4 opposite to that having the gates 9 and 12 therein has formed therein contiguous the end 5 of the runway 1' a battery, preferably three, of cull delivery, or discharge, gateways 13 spaced close together along said wall and located above the bottom 3. The gateways 13 are preferably rectangular in form. Each gateway 13 is controlled by a gate 14 suitably mounted in the appropriate side wall 4 for vertical sliding movement and provided in its lower end with an aperture 15 similar in size and shape to the gateways 13 and designed to register with the gateway 13 in the lowermost position of the gate. Thus, as will be seen, by elevating, or adjusting vertically, said gates 14 the size of the gateways 13 may be decreased vertically and the level of discharge of the culls therefrom varied as desired. Another cull delivery gateway 16, similar to gateways 13, and controlled by a gate 17, similar to gates 14, is provided in the end 5 of runway 1' adjacent the battery of gateways 13, said gateways 16 and gate 17 being thus disposed oblique to the gateways 13 and gates 14 for a purpose presently apparent. The gates 14 and 17 are designed to be adjusted to selected set positions. For this purpose, said gates 14 and 17 are arranged to be suspended from a beam-like superstructure 18 arising from the appropriate side wall 4 and the end 5, each gate 14, 17 being suitably secured at its upper end, as at 19, to a gate adjusting rod 20 extending upwardly and centrally therefrom through said frame 18 and having threaded on its upper end a wing nut 21. A coiled spring 22 sleeved on each rod 20 intermediate the frame 18 and a short tube 18' sleeved onto the lower end of the rod tensions the related gates 14, 17 against upward adjustment.

In the seed delivery end 5 and adjoining the side wall 4 having the gates 9 and 12 therein is another battery of rectangular gateways 24, 25, 26 and 27 spaced along said end close together and level at their bottoms with the bottom 3. The gateways 24, 25, 26 and 27 are adapted to be controlled by sliding gates 28, 29, 30 and 31 mounted for sliding adjustment in the same manner as gates 14, 17 by rods 32 extending upwardly into a fixed frame 33 with wing nuts 34 on the upper ends thereof and springs 35 thereon between said frame and said gates bearing on tubes 36 similar to tubes 18'.

The gate 31 of the battery described in the immediately preceding paragraph which, as shown in Figure 1, is at one side of the series is designed to function, when shut, as an overflow gate to establish the level of the stock in the runway 1' and for that purpose is provided with a narrow transversely extending slot 37 therein adjacent its lower end which, when said gate is closed, is located midway of the gateway 27.

The side walls 4 and the ends 5 and 6 may be formed of any suitable strip-like material, for instance wood, bolted to the deck 1, as indicated at 38, and further secured to said deck by angle brackets 39 located at suitable points. Also, angle brackets may be used at corners of the runway 1' to secure the same together and as indicated at 41.

The rock baffle 7 is preferably increased in height, as at 42, to form one side of the rock trap 8.

Referring now to the operation, the stock is introduced into the feed end 6 while air is blasted in the usual manner upwardly through the bottom 3, and with gates 9, 12, 24 to 27 closed and the gates 14, 17 adjusted to the desired elevation. Under the agitation of the stock in said end 6 resulting from the blast passing upwardly therethrough, the heaviest matter, to wit, rock gravitates to the bottom to accumulate in said end 6 and trap 8 so that it will issue through the gate 9 when opened into the chute 11 for collection as desired. The stock freed of rock in this manner overflows the baffle 7 and subsequently fills the remainder of the runway 1' to a level established by the overflow slot 37 in the gate 31. During this filling operation, as the stock feeds over the baffle 7 and down the runway 1' the next lighter foreign matter, to wit, the adobe gravitates to the adobe trap side of the runway 1' and into the adobe trap formed by the baffle 12 and adjacent side wall 4 and is collected in said trap to issue through the gate 12 when opened into the chute 13 for disposal also as desired. At this point, it should be explained that the runway 1' also slants downwardly laterally, or in the direction of its width, slightly from the side having the rock and adobe traps therein.

As will be manifest, during rise of the stock to the level established by the slot 37 of door 31, the culls have been floated to the top of the stock to feed out of the openings 15 in the gates 14, 17 and the good cleaned seed will have gravitated to the bottom 3. At this point the gateways 24, 25, 26 may be opened to permit the cleaned seed to issue therefrom for collection in any suitable manner.

It will now be seen that our invention provides for equipping the deck of air blast separators with means for building up the stock capacity of the separator as well as for expeditiously and thoroughly cleaning such stock. The capacity increase of course depends on the kind of seed being treated. However, in actual practice it has been found that the capacity of the separator may be increased by at least fifty per cent.

The foregoing will, it is believed, suffice to impart a clear understanding of our invention without further explanation.

Manifestly the invention, as described, is susceptible of modification without departing from the inventive concept and right is herein reserved to such modifications as fall within the scope of the subjoined claims.

What is claimed is:

1. In a seed cleaner for separating rock and culls from seed stock under the action of gravity and air blasted through the stock, a deck having parallel sides and adapted for endwise vibration, an elongated runway on said deck for receiving said stock, said runway being of bin-like form with parallel sides extending obliquely of the sides of the deck and having a foraminous bottom incorporated in said deck for the passage of air under pressure upwardly through the stock in said runway, said bottom slanting toward one end of the runway and toward one side thereof, a laterally offset extension at the higher end of said runway introducing the stock therein, a baffle extending across the bottom of the runway in front of said extension and forming together with one side of the runway a rock trap, a door on said one side of the runway for opening and closing said trap, a battery of cull discharge gates in the opposite side of the runway adjacent the lower end thereof having discharge apertures therein above said bottom for the gravitational discharge of culls therethrough from the top of the stock, and a battery of seed delivery gates in the lower end of said runway opening vertically from said bottom for the gravitational discharging of the seed therethrough from the bottom of the stock.

2. In a seed cleaner for separating rock and culls from seed stock under the action of gravity and air blasted through the stock, a deck having parallel sides and adapted for endwise vibration, an elongated runway on said deck for receiving said stock, said runway being of bin-like form with parallel sides extending obliquely of said sides of the deck and having a foraminous bottom incorporated in said deck for the passage of air under pressure upwardly through the stock in said runway, said bottom slanting toward one end of the runway and toward one side thereof, a laterally offset extension at the higher end of said runway introducing the stock therein, a baffle extending across the bottom of the runway in front of said extension and forming together with one side of the runway a rock trap, a door in said one side of the runway for opening and closing said trap, a battery of cull discharge gates in the other side of the runway adjacent the lower end thereof having discharge apertures therein above said bottom for the gravitational discharge of culls therethrough from the top of the stock, a battery of seed delivery gates in the lower end of said runway opening vertically from said bottom for the gravitational discharging of the seed therethrough from the bottom of the stock, and a trap at said one side of said runway intermediate the ends thereof for adobe opening toward the higher end of said runway.

3. In a seed cleaner for separating rock and culls from seed stock under the action of gravity and air blasted through the stock, a deck having parallel sides and adapted for endwise vibration, an elongated runway on said deck for receiving said stock, said runway being of bin-like form with parallel sides extending obliquely of said sides of the deck and having a foraminous bottom incorporated in said deck for the passage of air under pressure upwardly through the stock in said runway, said bottom slanting toward one end of the runway and toward one side thereof, a laterally offset extension at the higher end of said runway introducing the stock therein, a baffle extending across the bottom of the runway in front of said extension and forming together with side of the runway a rock trap, a door in said one side of the runway for opening and closing said trap, a battery of cull discharge gates in the other side of the runway adjacent the lower end thereof having discharge apertures therein above said bottom for the gravitational discharge of culls therethrough from the top of the stock, a battery of seed delivery gates in the lower end of said runway opening vertically from said bottom for the gravitational discharge of the seed therethrough from the bottom of the stock, and a slotted overflow gate in the lower end of the runway for establishing the level of the stock therein.

CLARENCE C. LE SUER.
SIDNEY O. EVANS.